United States Patent [19]

Hansen

[11] Patent Number: 4,612,667
[45] Date of Patent: Sep. 16, 1986

[54] EMERGENCY TRANSMITTER AND METHOD OF OPERATING THE SAME

[75] Inventor: Holger Hansen, Hamburg, Fed. Rep. of Germany

[73] Assignee: Autoflug GmbH, Rellingen, Fed. Rep. of Germany

[21] Appl. No.: 552,051

[22] PCT Filed: Jan. 19, 1983

[86] PCT No.: PCT/DE83/00007
§ 371 Date: Sep. 22, 1983
§ 102(e) Date: Sep. 22, 1983

[87] PCT Pub. No.: WO83/02699
PCT Pub. Date: Aug. 4, 1983

[30] Foreign Application Priority Data
Jan. 22, 1982 [DE] Fed. Rep. of Germany ....... 3201845

[51] Int. Cl.⁴ .............................................. H04B 1/04
[52] U.S. Cl. ...................... 455/98; 455/103; 455/127; 455/128
[58] Field of Search .................. 455/97, 98, 95, 103, 455/105, 112, 116, 118, 127, 128, 104; 375/65, 62, 70; 370/50; 343/386, 413, 463, 464

[56] References Cited

U.S. PATENT DOCUMENTS

| | | | |
|---|---|---|---|
| 2,947,985 | 8/1960 | Cooley | 455/103 |
| 3,500,209 | 3/1970 | Fletcher et al. | 455/128 |
| 3,566,235 | 2/1971 | Rose et al. | 455/98 |
| 3,617,894 | 11/1971 | Benoit | 455/103 |
| 3,723,881 | 3/1973 | Burton | 455/103 |
| 3,870,959 | 3/1975 | Wootton | 455/98 |
| 4,110,709 | 8/1978 | Day, Jr. | 455/105 |

FOREIGN PATENT DOCUMENTS 1060173 3/1967 United Kingdom .................. 455/52

Primary Examiner—Marc E. Bookbinder
Attorney, Agent, or Firm—Becker & Becker, Inc.

[57] ABSTRACT

An emergency transmitter provided with separate devices for the transmission of a first frequency and a second frequency. The transmitter is contained within a floatable housing. The transmission devices are connected via a switch to a battery. The transmission devices are comprised of a common quartz or crystal oscillator connected with frequency multipliers which are connected to drive stages and to high frequency final stages. The latter are connected to a transmission antenna which extends from the housing. Also provided is a signal generator for modulating the transmitted frequencies. A fixed-cycle control device is associated with the first and second transmission devices and alternately sets the two transmission devices into operation.

11 Claims, 8 Drawing Figures

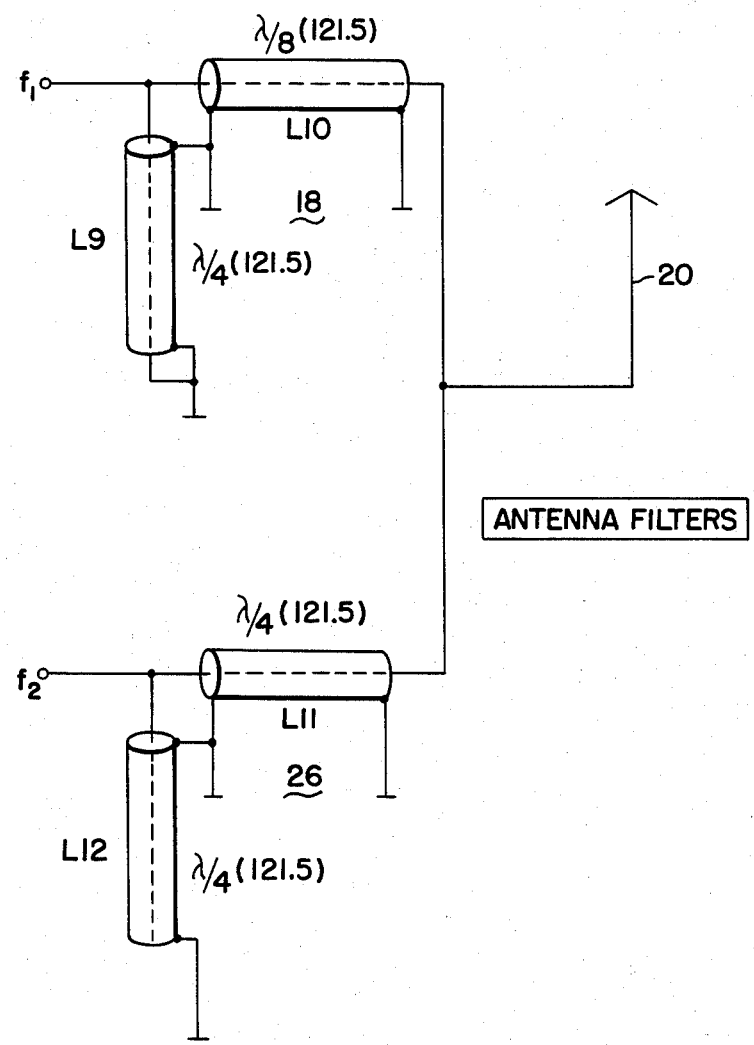

EMERGENCY TRANSMITTER AND METHOD OF OPERATING THE SAME

FIELD OF THE INVENTION

The present invention relates to an emergency transmitter having a first transmission means for a first frequency, and a second transmission means for a second frequency. The transmission means are accommodated in a floatable housing, and can be connected via a switch with a battery. The transmission means comprise a common quartz or crystal oscillator after which are connected respective frequency multipliers which in turn are respectively connected to driver and final stages. The latter are connected to a transmission antenna which projects out of the housing. Single tone generators are also provided for modulation of the transmitted frequencies. The present invention also relates to an operation method.

DESCRIPTION OF THE PRIOR ART

Emergency transmitters of this general type are known; for example, the radio buoy EB 218 of the company LAWO Gerätebau, D-7550 Rastatt-Ottersdorf. These radio buoys transmit on the aircraft frequencies 121.5 MHz (civilian) and 243 MHz (military).

Such emergency transmitters are preferably utilized for rescue from emergencies at sea, and make possible a large area search and rescue action with the aid of aircraft. Due to the signal radiated from the emergency transmitter, bearings can be taken on the position of the emergency transmitter with the aid of aircraft and helicopters even at a great distance, so that even during conditions of poor visibility, and especially at a great distance, the position of damaged craft can be determined.

Although the heretofore known emergency transmitter operates satisfactorily, it is, however, still relatively large and therefore cannot be optimally used in many situations. Weight and size play a considerable role especially when the emergency transmitter must be carried constantly by the person to be protected.

These two parameters (size and weight) cannot be arbitrarily reduced, since especially the supply battery for the emergency transmitter must have a sufficient capacity in order on the one hand to enable a reliable operation over a certain minimum time period, for example 36 hours, and on the other hand so that the radiated transmission power does not become too small since then the maximum range is reduced.

SUMMARY OF THE INVENTION

An object of the present invention, by special measures, without changing the range or the maximum duration of operation, is to achieve a reduction of the energy delivered by the battery and hence its size by nearly half. Conversely, without changing the power of the battery, these measures make possible a corresponding increase of the range and/or the maximum duration of operation.

These objects are realized by associating a fixed-cycle control device with the first and second transmission means of an emergency transmitter of the aforementioned general type. This fixed-cycle control device alternately sets the two transmission means into operation.

In contrast with the state of the art, the two emergency frequencies thus are not radiated simultaneously, but rather are radiated alternately, so that the power which is to be delivered by the battery, and which is essentially determined by the transmission stage, only has to suffice for one transmission means, while with the state of the art the battery must simultaneously supply both transmission means and therefore must deliver twice as much power.

Pursuant to further advantageous specific embodiments of the present invention, the fixed-cycle control device may include a counter which is triggered by a fixed-cycle signal generator having a fixed repetition frequency; the counter may have two outputs which during the cycle of the repetition frequency each emit a rectangular signal pulse which are out of phase relative to one another per a given period of time. The fixed-cycle signal generator may be formed by a ramp signal generator having connected thereto a differentiator and/or a pulse shaper. The ramp signal generator may also have connected thereto a tone frequency oscillator, the frequency of which can be controlled so that the tone or audio frequency thereof varies as a function of the ramp signal, and which is provided for modulation of at least one of the transmission means. The time period of the repetition frequency may be an integral multiple of the length of the rectangular pulse, especially four times the length of the pulse. The phase offset per given period of time may equal half of the time period. The time period of the repetition frequency may be four seconds, with the phase offset being two seconds, and the lengths of the pulse being one second. The fixed-cycle control and modulation may be effected by changing the emitter potential of a transistor which is operated in a grounded emitter circuit and forms a doubler stage. Two transistors in a Darlington-circuit may deliver the emitter potential and act as the emitter resistance for the transistor of the doubler stage. These transistors may be excited on the one hand by the tone frequency, and on the other hand by the rectangular pulse. The tone or audio frequency may trigger the base of the input transistor of the Darlington-circuit via a diode, the connecting point of which with the base can be acted upon the rectangular signal pulse.

The first and second transmission means may be connected via antenna filters to a common antenna, with the final stage outputs being insulated from one another. The second frequency may be twice as great as the first frequency, and the antenna filters may comprise coaxial-line sections of the length $\lambda/4$ and $\lambda/8$, or the $\lambda/4$ and $\lambda/4$, relative to the first frequency. The antenna filters may be connected in such a way that at any given time they place the final stage which is not operating at a point of the output where no voltage is carried.

The power supply may be effected by a read-contact which can be activated by a magnetic pin which can be pulled out of the housing. The read-contact may be held in a certain (on) switching position by a magnet which is fixed relative thereto when the magnetic pin is pulled out. The magnet of the pin, is the inserted position, compensates for the effect of the fixed magnet and brings the read-switch into the other (off) switching position. The power supply may be effected via the series arrangement of a lithium battery and the emitter-collector section of a transistor, the base of which can be connected via the read-contact with that terminal of the battery which is not connected to the transistor.

The method of operating an emergency transmitter which is provided with a first transmission means for a first frequency, and a second transmission means for a second frequency, is characterized primarily in that the two transmission means are operated alternately, and the duration of operation of one of the transmission means does not overlap the duration of operation of the other transmission means. The repetition frequency of each transmission means may be a number of seconds, preferably four seconds, with the respective duration of operation being less than half, preferably ¼, of the repetition frequency period, preferably one second. The transmission means may be modulated during their respective duration of operation with a changing tone frequency. The tone frequency may change during their respective duration of operation from a higher to a lower frequency, and preferably changes linearly from a frequency of about 1.3 kHz to a frequency of about 600 Hz.

Emergency transmitters of the type described must be watertight. It is therefore expedient to effect the switching-on of the transmitter in such a way that no entry into the housing is required. A magnetically actuatable reed-contact constitutes such a switching-on device which enables a particularly simple watertight construction. In order that such a reed-contact is not unintentionally switched-on by the magnetic interference fields which often occur on ships, and hence so that the emergency transmitter is not unintentionally set into operation, which can lead to an unnecessary discharge of the battery and also to a false alarm, the power supply, which is effected via a reed-contact which can be actuated by means of a magnetic pin which can be pulled out of the housing, is complemented by a permanent magnet which is fixedly associated with the reed-contact and holds the latter in a specific (on) switching position when the magnetic pin is pulled out (for the case of a distress signal), with, however, the magnet of the pin in the inserted position compensating for the effect of the fixed magnet and bringing the reed-switch into the other (off) switching position. By means of these measures, external interference fields can no longer affect the position of the reed-contact, so that this also can not be a source for reducing operating time as a result of undesired discharge of the battery.

BRIEF DESCRIPTION OF THE DRAWINGS

The invention will be subsequently explained in detail with the aid of one specific embodiment, which is illustrated in the drawings, in which:

FIG. 4 shows circuit particulars of the antenna filters which connect the final stages with the antenna;

DESCRIPTION OF PREFERRED EMBODIMENTS

Figure 1:
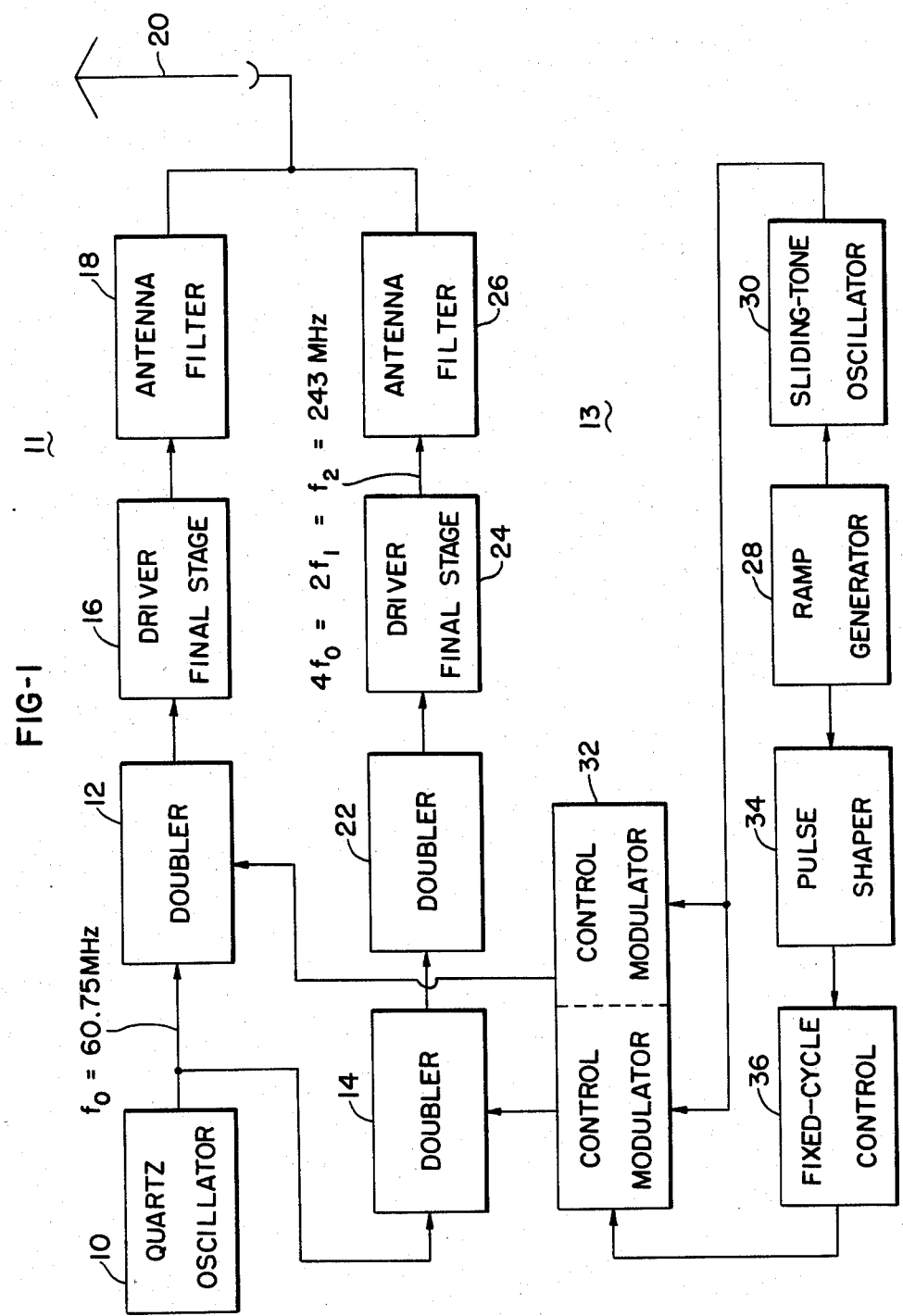
FIG. 1 is a block diagram of the electrical circuit of the inventive emergency transmitter.

FIG. 1, in the form of a block diagram, illustrates the electric circuitry of the inventive emergency transmitter. As can be seen from this figure, the emergency transmitter includes a quartz oscillator 10 which generates a fundamental frequency of, in this case, 60.75 MHz. This frequency is fed to a doubler 12 which delivers the doubled frequency $2f_0 = f_1 = 121.5$ MHz to a driver and final stage 16, which then deliver this signal frequency via an antenna filter 18 to a rod antenna 20. The rod antenna 20 projects out of the non-illustrated, floatable housing, which surrounds in a water proof manner the circuitry illustrated in FIG. 1. The doubler 12, driver and final stage 16, and the antenna filter 18 form a first transmission means 11 for a first emergency frequency of 121.5 MHz. A second, double as great emergency frequency (243 MHz) is generated by a second transmission means 13 which also includes a doubler 14 which is triggered by the quartz oscillator 10, as well as a second doubler 22 which is connected after the doubler 14 and which in turn again feeds a driver and final stage 24. This final stage, via an antenna filter 26, also is connected to the rod antenna 20.

Both of the emergency frequencies of an emergency transmitter, in order to be recognized as an emergency signal, must be modulated in a certain manner. For this purpose, as shown in FIG. 1, a ramp generator 28 also is provided for the emergency transmitter. The output of this ramp generator delivers a ramp or saw-tooth voltage, which within a certain time, for example within one second, increases linearly from a low voltage to a higher voltage, in order then, within a considerably shorter time, to again drop to the original lower voltage and then again increase in the manner described.

Connected after the ramp generator 28 is a sliding-tone oscillator 30 which at its output releases a changing tone voltage, the frequency of which changes with the ramp voltage which is applied at the oscillator 30. The transmission means 11, 13 are then modulated with this tone or audio frequency via a control modulator 32 in such a way that, with regard to the two emitted audio frequencies, a 100% amplitude modulation results. In the present case, this occurs by control of the first doubler stages 12 and 14, as will be subsequently explained in detail.

The ramp generator also controls a pulse shaper 34, which with every change or receding of the ramp voltage of the ramp generator 28 delivers a pulse to a fixed-cycle control 36 which is connected after the pulse shaper and, as will be described subsequently, with the aid of the control modulators 32 triggered thereby only allows an alternate operation of the transmission means 11, 13.

The components of the inventive emergency transmitter, which are illustrated only as blocks in FIG. 1, will now be discussed in greater detail.

Figure 2A:
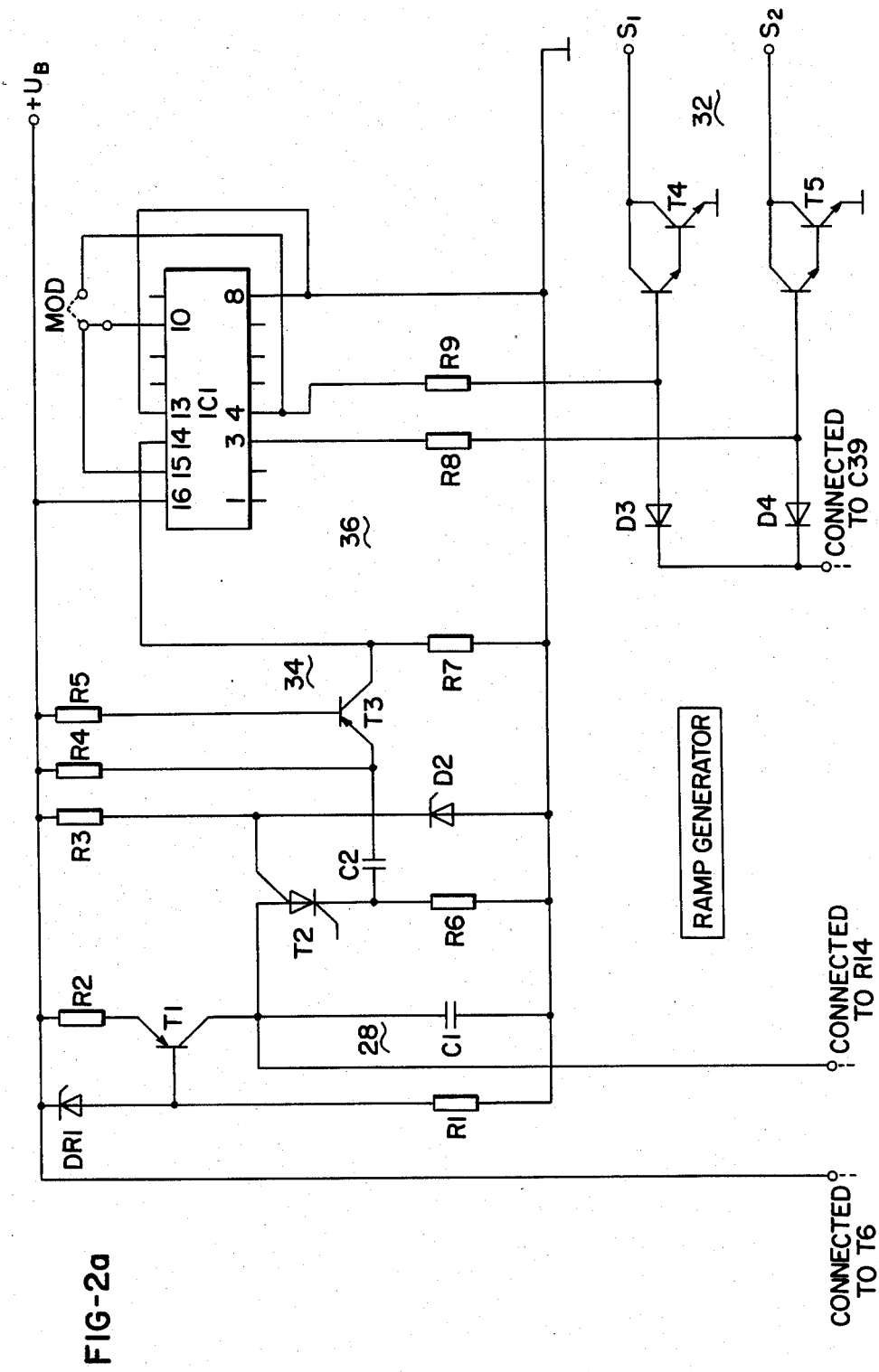
FIGS. 2a and 2b show circuit particulars of the ramp generator, which delivers the central time control, of the sliding-tone oscillator connected thereafter, and the pulse shaper and fixed-cycle control, which also are connected after the ramp generator and trigger the two control modulators.

As can be seen in FIG. 2a, the ramp generator 28 includes a transistor T1 which operates as a constant source of current and obtains its operating energy from a working current source ($+U_B$). The constant current is formed by a voltage divider R1, DR1 having its divider point at the base of T1; R1 is an ohmic resistor, and DR1 is a breakdown or zener diode. The constant current which flows over the emitter-collector section of this transistor charges a capacitor C1 with constant current, so that the voltage at C1 increases linearly until the breakdown voltage of a thyristor T2 is reached, which in turn is fixed by the zener diode D2 and the resistor R3. Upon breakdown of the thyristor, the latter becomes conductive and discharges the capacitor C1 via the resistor R6, whereupon a positive pulse-like voltage is delivered via the capacitor C2 to the emitter of a transistor T3. If C1 is discharged, the thyristor T2 again blocks and C1 is again charged in the manner described. Thus, a co-called ramp or saw-tooth voltage results at the capacitor C1; the recurrence frequency of this voltage can be fixed, for example with the aid of the resistor R2.

Figure 6:
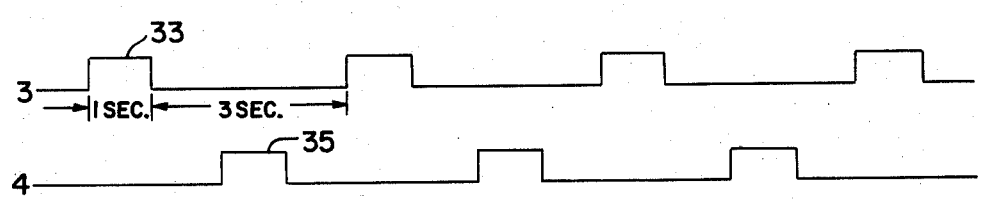
FIG. 6 is a time diagram explaining the manner of operation of the inventive emergency transmitter.

The transistor T3 amplifies the positive pulse delivered via C2, with C2 and T3 thus forming the pulse shaper 34. The thus shaped and amplified pulse is delivered to a counter IC1, which is embodied as an integrated component, and in this instance has sixteen connections. IC1 is connected as a frequency divider, the divider structure of which can be varied by means of external wiring. The wiring illustrated in FIG. 2 between the connections 10 and 15 results in rectangular pulses at the connections 3 and 4; these pulses, over a given period of time, are out of phase relative to one another, as illustrated in FIG. 6. With the specific embodiment presently being described, for three seconds no pulse follows at the connection 3 a pulse 33 having a duration of one second; at connection 4, in the middle of this no-pulse span, there is a corresponding pulse 35 having a duration of one second.

These rectangular pulses 33, 35 represent the fixed-cycle control 36, and have a very specific phase relationship to the ramp voltage of the ramp generator 28.

The rectangular pulses of the connections 3 and 4 control a transistor-Darlington-connection T4 or T5, which serve as variable emitter resistances for the transistors T16 and T19 of the doubler stages 12 and 14, which will be described subsequently.

Figure 2B:
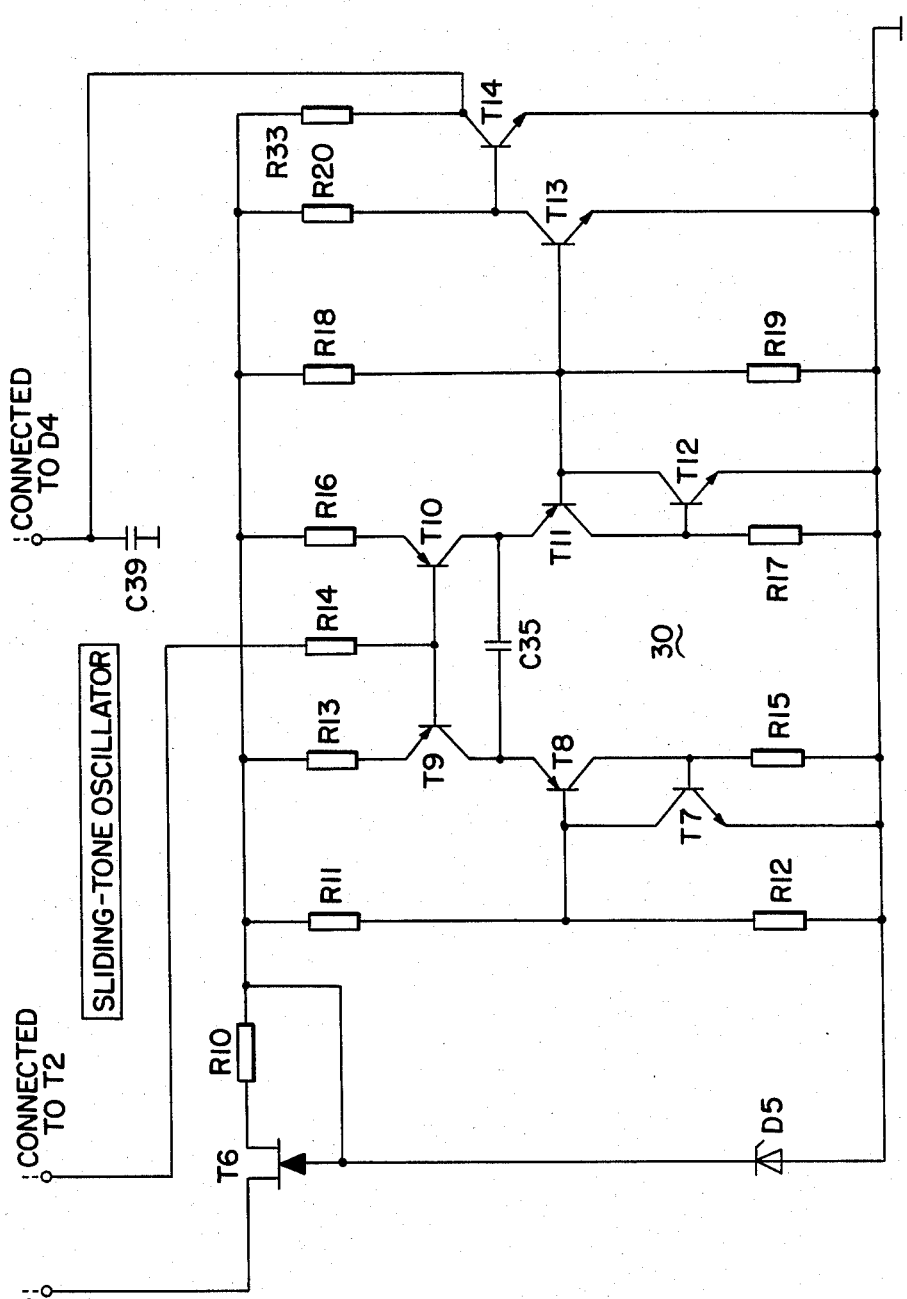

The sliding-tone oscillator 30 illustrated in FIG. 2b is provided with an operating voltage of approximately 4.2 V from a constant source of power which is formed by a transistor T6 which is controlled by a zener diode D5. The transistors T7 and T8, or T11 and T12, are connected as four-layer diodes and breakdown at a voltage which is determined by R11 and R12, as well as R18 and R19. The two four-layer diodes are furthermore connected via C35. The capacitor C35 is charged by means of the transistors T9 or T10, which operate as constant current sources.

If T7 and T8 become conductive, the emitter of T becomes negative via C35. The capacitor C35 is then charged via T10. If T11 and T12 now break down, the emitter of T8 becomes negative T7 and T8 reset, and the charging of C35 is now via T9. Since the base bias for T9 and T10 from the ramp generator 28 (C1) falls off, the constant current sources T9 and T10 also each deliver decreasing charging current for C35.

The oscillating frequency of the sliding-tone oscillator therefore varies from a high frequency to a lower frequency, for example from approximately 1.3 kHz to approximately 600 Hz. These signal frequencies are amplified via the transistors T13 and T14, and are transmitted via diodes D3, D4 to the aforementioned Darlington-transistor-controls T4 and T5. The Darlington-transistors T4 and T5 therefore are acted upon on the one hand by the fixed-cycle control voltages (pulses 33, 35) illustrated in FIG. 6, and on the other hand by the audio frequency delivered by the sliding-tone oscillator; this occurs in such a manner that the fixed-cycle control pulses 33 activate the Darlington-transistor-control T5 for one second during every four-second interval, and during each activation of one second the transistor-control T5 is interrupted by an alternating voltage of 1.3 kHz . . . 600 Hz. Similarly, and out of phase during a given period of time, the Darlington-control T4 is activated by the pulse 35 (FIG. 6) for one second during every four-second interval, with the duration of this activation again being interrupted by an alternating voltage having a frequency which at the beginning of the second is 1.3 kHz, but which falls off during this second to 600 Hz.

Figure 3A:
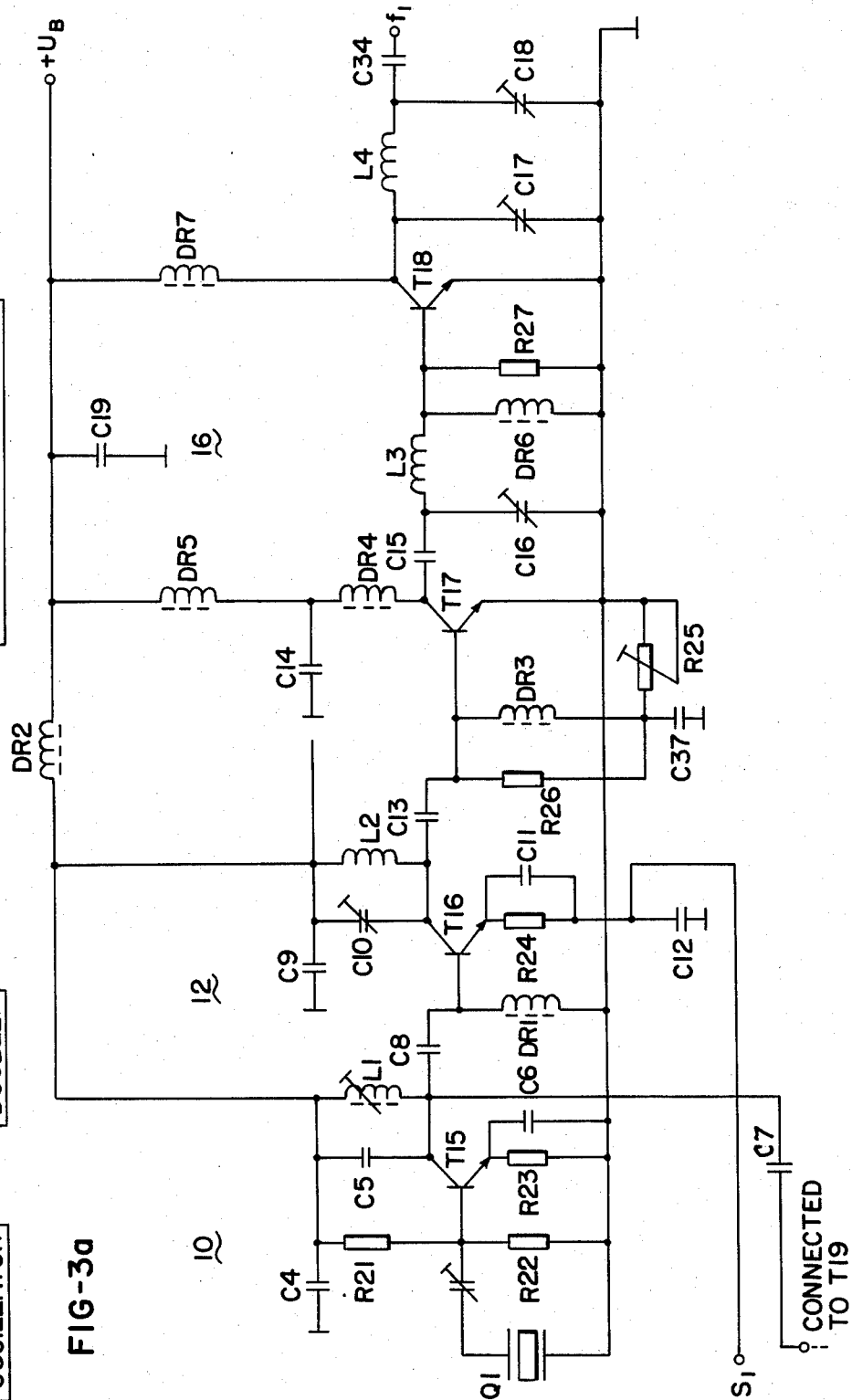
FIGS. 3a and 3b shows circuit particulars of the quartz oscillator, which serves to generate the transmitting frequencies, of the doubler which is connected after the quartz oscillator and is modulated by the control modulators, and driver and final stage devices which are connected after the doubler.
Figure 3B:
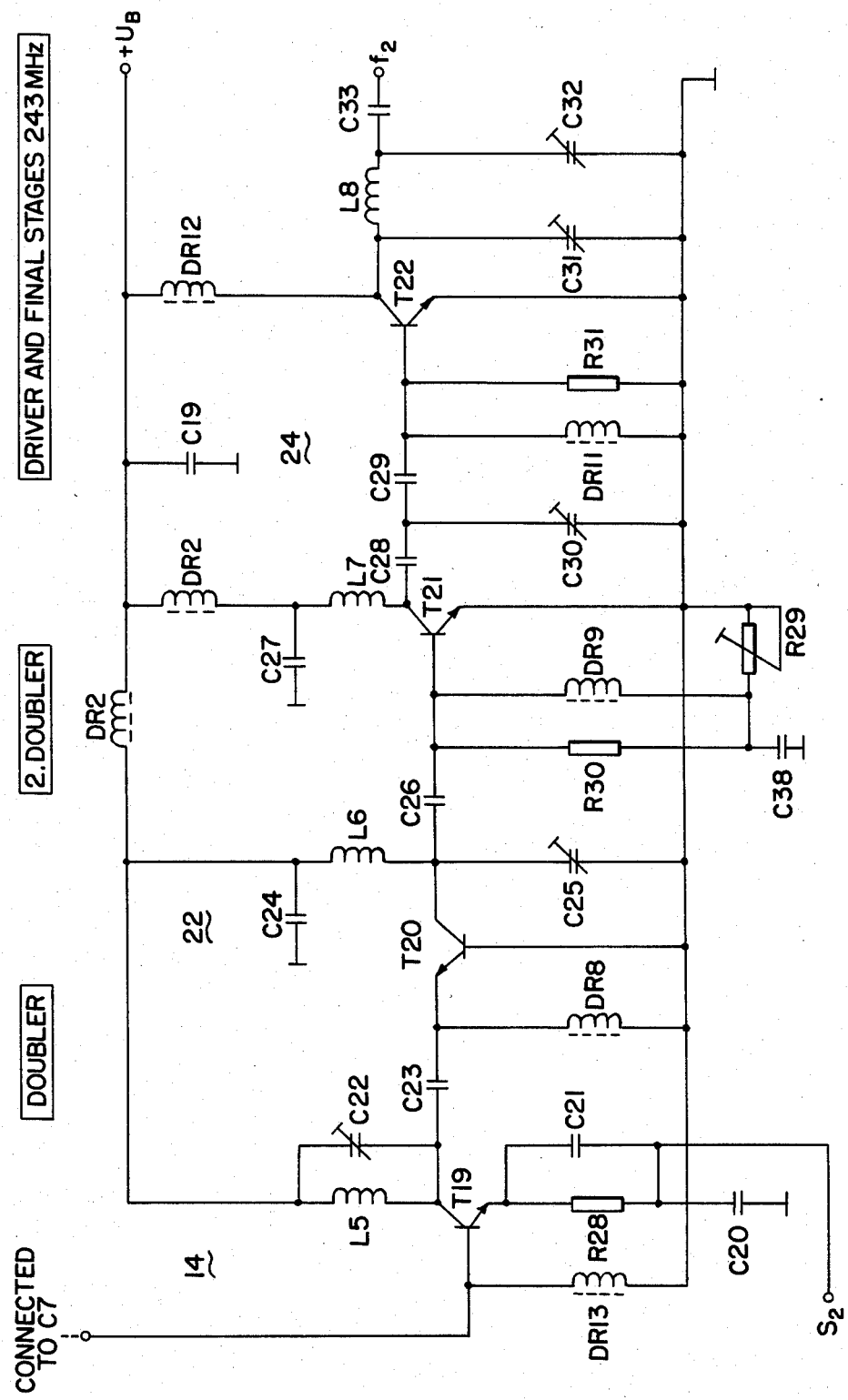

FIG. 3 first shows a quartz oscillator 10 which comprises a transistor T15 which operates in a Pierce circuit and oscillates in a true crystal manner at 60.75 MHz. The oscillator delivers to the doubler 12, which is provided with the transistor T16, as well as to the further doubler 14, which includes the transistor T19, its collector voltage which has a frequency of 60.75 MHz. At the collectors of T13 and T19, the doubled frequency of 121.5 MHz then can be removed and fed on the one hand to the driver and final stage 16, which includes the transistors T16 and T17, and on the other hand to the second doubler stage 22 which is provided with the transistor T20. The frequency of 243 MHz then appears at the collector of T20; such frequency is fed to the driver and final stage 24, which comprises the transistors T21 and T22. In so doing, there appear at the output connections $f_1$ and $f_2$ high frequency signals having a frequency of $f_1 = 121.5$ MHz and $f_2 = 243$ MHz respectively; the signals have a power of, for example, 0.5 or 1 W.

As already mentioned, the emitter resistances of the transistors T16 and T19, which constitute the first doublers 12 and 14 respectively, are formed by the Darlington-transistor-controls T4 and T5 of the control modulator 32. This means that the respective doubler only operates when the transistor control T4 or T5 is conductive. This results in that the driver and final stage 16 and 24 of the two transmission means 11, 13 are only supplied triggering energy, and the same only deliver an output signal, when the associated fixed-cycle control pulse 33 or 35 (FIG. 6) exists, and that furthermore, during this pulse or cycle time the transmission means 11 or 13 is again interrupted in the cycle of the sliding-tone frequency. This results in a 100% amplitude modulation by means of this sliding-tone frequency.

There is thus achieved that at any given time only one of the two transmission means 11, 13 operates, so that a considerable savings of battery power is possible. This particular economy with regard to the supply of energy is further emphasized by the fact that the two transmission means 11, 13 are switched off for three seconds between the individual working periods of one second duration; furthermore, there is also no transmission energy being radiated during the high modulation percentage resulting from the sliding-tone oscillator 30.

In order to insulate the output connections $f_1$ and $f_2$ of the final stages of the two transmission means from one another, antenna filters 18 and 26 are provided, which are illustrated in greater detail in FIG. 4. As shown in FIG. 3, at the output of each of the two final stages is located a π-circuit (C17, L4, C18 and C31, L8, C32), which enables the coupling of the output energy of the final stage to the antenna filter of FIG. 4, and from there to the rod antenna 20. The antenna filter comprises coaxial transmission-line circuits which are proportioned such that at any given time, the final stage which is not operating is applied at a point of the output which carries no voltage.

Thus, for example, the coaxial transmission line section L9 (which has a length, λ/4, where λ denotes the wave length of the frequency of 121.5 MHz on the table being used) is highly resistive at 121.5 MHz at the input (parallel-resonant circuit), while L10, with a length of λ/8, represents a section of short cable of, for example, 60 ohms, which leads to the base of the antenna. L11 and L12, each of which has a length of λ/4, form an open λ/2-circuit and thereby having a high resistance at both the input and output, while the connecting point $f_2$, at which, via C33, the output of the second driver and final stage 24 is connected, has no influence on the high-resistance input located at the base of the antenna. Rather, the circuits L11 and L12 additionally act as a parallel-reasonant circuit for the frequency of 121.5 MHz, so that no energy can pass approximately from the connection point of the antenna 20 to the transistor of the drive and final stage 24 for 243 MHz. However, if the final stage is in operation for 243 MHz, L12 acts as a parallel-resonant circuit (for the frequency of 243 MHz involved is a λ/2-circuit, which is open), while L11 again represents a 60 ohm line which leads to the base of the antenna. For 243 MHz, L10 and L9 form a ⅜ λ-circuit, which is grounded at the output and has a high resistance at the input (parallel circuit). The final stage for 121.5 MHz, which is connected via C34, is at minimum voltage and therefore has no effect on the output signal of 243 MHz. For a frequency of 200 MHz, which is between the two aforementioned frequencies, the described antenna filter yields a band-width of 4 MHz and an energy or Q factor of 50.

There is thus achieved that also with regard to the radiation of the energy delivered by the final stages, no losses occur which reduce the range.

Figure 5:
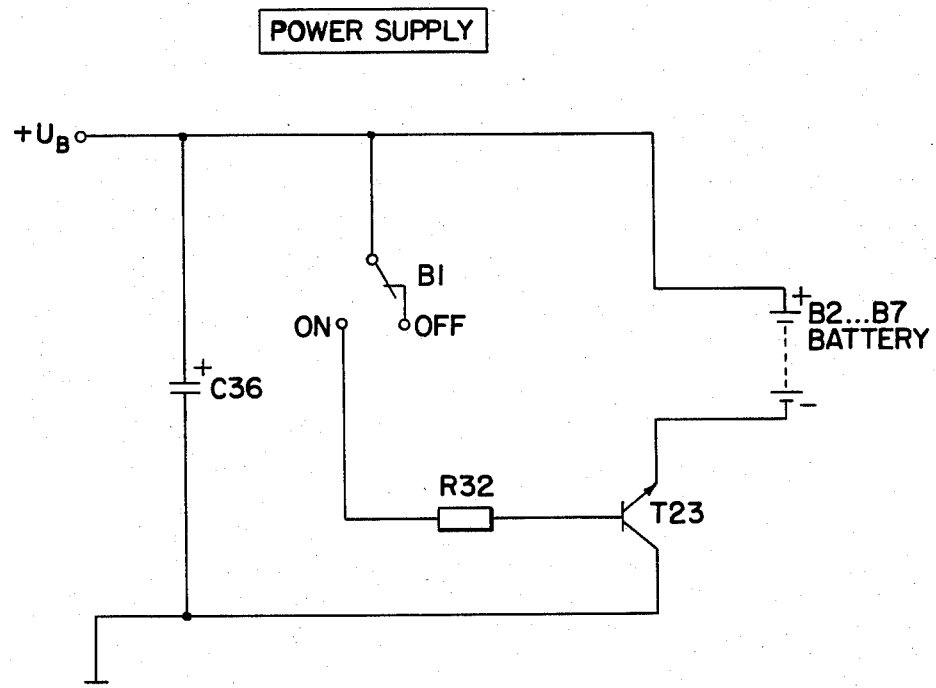
FIG. 5 shows circuit particulars of the power supply.

FIG. 5 shows the particulars of the current supply. A lithium battery B2 . . . B7 serves as a source of current, and one end thereof (here the negative end) is grounded via the emitter-collector path of a transistor T23, while the other end (here the positive end) is connected to the connection point $+U_B$. The base of the transistor T23, via a resistor R32, is connected to a contact of a reed-switch B1, i.e. a switch the position of which can be varied by an external magnetic field. Although normally reed-switches are switched by switching an external magnetic field on or off, in the present case a permanent magnet is also fixed on the switching plate on which the reed-switch B1 is located. The permanent magnet is fixed in such a way that it brings the reed-switch into its non-illustrated "on" position. In this position, the base of the transistor T23 is supplied with positive base voltage and therefore has a low resistance, as a result of which the battery voltage is applied to the individual stages.

By means of a pin which can be inserted from the outside and which carries a further magnet, the effect of the fixed permanent magnet can be compensated for in such a way that the reed-switch B1 is placed in the "off" position illustrated in FIG. 5. This is the inoperative position, in which the emergency transmitter transmits no signal. Only when the magnetic pin is pulled out of the housing does the reed-contact go into the inoperative position (on position). By means of these measures, the reed-contact is always under a strong magnetic field influence, so that external interfering magnetic fields can cause no undesired switching-on procedures, which on the one hand would unnecessarily discharge the battery, and on the other hand could lead to false alarms.

The capacitor C36 of FIG. 5 is provided in order to assure a reliable pre-oscillation of the oscillator when the battery has already lost some of its capacity.

The emergency transmitter constructed pursuant to the present invention, and the manner in which it is operated, can considerably contribute to the greater certainty with which people who have encountered an emergency at sea, and also people who have encountered an emergency during expedition on land, can be head and rescued, because these people can send their distress signals for a considerably longer period of time then was previously possible. Thus, not only is the life of the individual better protected, but there is also an advantage with regard to political economy, since the loss of personnel, equipment, and work output can be reduced or entirely prevented. Any measure which increases the certainty that a person is not without hope of rescue in an emergency increases the readiness of performance. This assures the commercial utility of the present invention.

The features of the subject matter of these documents as disclosed in the preceding specification, the Patent Claims, the Abstract, and the drawings can be important that only individually but also in any desired combination relative to one another for the realization of the invention in its various embodiments and implementations.

I claim:

1. An emergency transmitter accommodated in a floatable housing and including a first transmission means for transmitting a first frequency, and a second transmission means for transmitting a second frequency different from the first frequency, with said first and second transmission means being connectable via a switch to a battery; said emergency transmitter further comprising:
   a quartz oscillator in common for both of said transmission means;
   respective frequency multiplying means, for each of said transmission means, connected to said quartz oscillator;
   respective driver and high frequency final stages, for each of said transmission means, connected to said frequency multiplying means;
   a transmission antenna which projects out of said housing and to which said driver and high frequency final stages are connected;
   respective antenna filters which are interposed between said transmission antenna in common therewith and the outputs of the respective final stages, and insulate the latter from one another;
   fixed-cycle control means operatively associated respectively with said first and second transmission means accommodated in common in the floatable housing and arranged for alternately setting said first and second transmission means into operation;
   a fixed-cycle signal generator including a ramp signal generator and a pulse shaper operatively connected therewith, said fixed-cycle control means being responsive to an output of said pulse shaper; and
   a sliding tone frequency oscillator which is connected to said ramp signal generator and the frequency of which can be controlled, with the tone frequency of said sliding tone frequency oscillator changing as a function of the ramp signal; said sliding tone frequency oscillator being provided with means for modulation of at least one of said transmission means.

2. An emergency transmitter according to claim 1, in which said second frequency is twice as great as said first frequency, and in which each of said antenna filters comprises coaxial-line sections, one filter having coaxial-line sections of lengths $\lambda/4$ and $\lambda/8$ relative to said first frequency, and the other filter having coaxial-line sections of lengths $\lambda/4$ and $\lambda/4$ relative to said first frequency.

3. An emergency transmitter according to claim 1, in which said fixed-cycle signal generator has a fixed repetition frequency; and in which said fixed-cycle control means includes a counter which is triggered by said fixed-cycle signal generator and has two outputs, each of which, within a cycle of the repetition frequency, emits a rectangular signal pulse, said pulses being out of phase by a predetermined phase offset relative to one another per a given period of time.

4. An emergency transmitter according to claim 3, in which the time period of said repetition frequency is an integral multiple of the length of a given one of said rectangular signal pulses; and in which said phase offset per given period of time is half of said time period.

5. An emergency transmitter according to claim 4, in which the time period of said repetition frequency is four times the length of a given one of said rectangular signal pulses, with said time period of said repetition frequency being 4 seconds, said phase offset being 2 seconds, and the length of said pulses being 1 second.

6. An emergency transmitter according to claim 5, in which said frequency multiplying means includes for each of said first and second transmission means a doubler stage formed by a transistor which is operated in a grounded emitter circuit, with fixed-cycle control and modulation being effected by alteration of the emitter potential of a given one of said transistors.

7. An emergency transmitter according to claim 6, which includes two further transistors, in a Darlington-circuit, which deliver said emitter potential and act as the emitter resistance for said transistors of said doubler stages, said further transistors being excited on the one hand by said tone frequency, and on the other hand by said rectangular pulses.

8. An emergency transmitter according to claim 7, in which the base of each of said Darlington-circuit transistors is connected with a diode via which said tone frequency triggers a given one of said last-mentioned transistors, with said rectangular pulses being applied to act on said connection between said diodes and their associated transistor bases.

9. An emergency transmitter according to claim 1, in which said switch for power supply from said battery is a reed-switch; and which includes a magnetic pin which can be pulled out of said housing for activating said reed-switch.

10. An emergency transmitter according to claim 9, in which said reed-switch has an "on" switching position, and an "off" switching position; and which includes a magnet fixedly associated with said reed-switch for holding it in said "on" switching position when said magnetic pin is pulled out of said housing; said magnetic pin, when inserted in said housing, compensating for the effect of said fixed magnet and bringing said reed-switch into said "off" switching position.

11. An emergency transmitter according to claim 9, in which said battery is a lithium battery having two terminals; and which includes a transistor, the emitter-collector section of which is connected in series with one of said battery terminals for effecting power supply, and the base of which is connectable via said reed-switch with the other one of said battery terminals.

* * * * *